United States Patent
Brown et al.

(10) Patent No.: US 11,458,408 B2
(45) Date of Patent: Oct. 4, 2022

(54) RACE ROYALE GAMEPLAY THROUGH VIDEO GAME

(71) Applicant: Microsoft Technology Licensing, LLC, Redmond, WA (US)

(72) Inventors: Michael Phillip Brown, Leamington Spa (GB); Carlos Alberto Sanchez, Redmond, WA (US); Benjamin Robert Thaker-Fell, Leek Wootton (GB)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 308 days.

(21) Appl. No.: 16/790,210

(22) Filed: Feb. 13, 2020

(65) Prior Publication Data
US 2021/0170283 A1     Jun. 10, 2021

Related U.S. Application Data

(60) Provisional application No. 62/946,279, filed on Dec. 10, 2019.

(51) Int. Cl.
*A63F 13/803* (2014.01)
*A63F 13/58* (2014.01)

(52) U.S. Cl.
CPC ............ *A63F 13/803* (2014.09); *A63F 13/58* (2014.09)

(58) Field of Classification Search
CPC ................. A63F 13/803; A63F 2300/8017
See application file for complete search history.

(56) References Cited

U.S. PATENT DOCUMENTS 5,924,927 A * 7/1999 Matsuura ................ A63F 9/143
                                                     463/62
7,497,776 B1 * 3/2009 Roman ............... A63F 13/5378
                                                     463/31
(Continued)

FOREIGN PATENT DOCUMENTS

WO      2019164246 A1      8/2019

OTHER PUBLICATIONS

"Verge Meets: Steve Iles of Pacer," by Craig Ball, published May 31, 2019. Source: https://vergemagazine.co.uk/verge-meets-steve-iles-of-pacer/ (Year: 2019).*
(Continued)

*Primary Examiner* — Steven J Hylinski

(57) ABSTRACT

The present disclosure relates to processing operations configured for generation and rendering of a race royale gaming environment that improves processing efficiency and racing gameplay in multiplayer scenarios. An exemplary race royale gaming environment provides a time-adjustable video game map configured to enable racing gameplay between a plurality of players (e.g., player-controlled vehicles) until an overall winner is determined. The race royale gaming environment is further configured to provide persistent vehicle upgrades that persist during at least one instance of racing gameplay (e.g., one or more races) in the race royale gaming environment. In other examples, the race royale gaming environment is configured to enable a player to challenge one or more other players to an elimination race within the time-adjustable video game map. The race royale gaming environment may further execute a predetermined number of rounds of gameplay that continuously reduces the time-adjustable video game map during racing gameplay.

20 Claims, 6 Drawing Sheets

(56) References Cited

U.S. PATENT DOCUMENTS

| | | | | |
|---|---|---|---|---|
| 8,747,199 | B1* | 6/2014 | Palmisano | A63F 13/212 463/43 |
| 2002/0132658 | A1* | 9/2002 | Brown | G07F 17/3244 463/16 |
| 2005/0278041 | A1 | 12/2005 | Bortnik et al. | |
| 2007/0066403 | A1 | 3/2007 | Conkwright | |
| 2019/0118086 | A1 | 4/2019 | Gentile et al. | |

OTHER PUBLICATIONS

"Find out why sci-fi racer Pacer is so much more than a Wipeout clone," by Kevin Wong, published Apr. 15, 2019. Source: https://www.redbull.com/us-en/pacer-formula-fusion-interview (Year: 2019).*

"Wipeout X Fortnite Pacer drags sci-fi racing into the 21st century—with battle royale," by Alex Sassoon Coby, published Apr. 4, 2019. Source: https://www.thesun.co.uk/tech/8788997/pacer-drags-sci-fi-racing-into-the-21st-century-with-battle-royale/ (Year: 2019 ).*

"Ready to go fast and blow stuff up? Futuristic Combat Racer, 'Formula Fusion' Rebrands as Pacer" by One PR Studio, published Apr. 4, 2019. Source: www.oneprstudio.com/ready-to-go-fast-and-blow-stuff-up-futuristic-combat-racer-formula-fusion-rebrands-as-pacer-as-it-revs-up-for-global-debut/ (Year: 2019).*

"Anti-gravity combat racer Formula Fusion rebranded PACER, coming to PS4, Xbox One, and PC in 2019," by Sal Romano, published Apr. 4, 2019. Source: https://www.gematsu.com/2019/04/anti-gravity-combat-racer-formula-fusion-rebranded-pacer-coming-to-ps4-xbox-one-and-pc-in-2019 (Year: 2019).*

"Overload—Not My Car: Vehicle Battle Royale," published Jul. 17, 2019. source: https://games.lol/overload-car-battle-royale/ (Year: 2019).*

"Burndown," by developer BigBro Games, release date on STEAM platform Nov. 4, 2019. Source: https://store.steampowered.com/app/920710/Burndown/ (Year: 2019).*

"What's the Difference Between MOBA and Battle Royale Games?" by Zach Cabading, published Oct. 19, 2019. Source: https://www.hp.com/us-en/shop/tech-takes/moba-vs-battle-royale-games (Year: 2019).*

"The battle royale gold rush is over," by Christopher Livingston, published Jun. 25, 2019. Source: https://www.pcgamer.com/the-battle-royale-gold-rush-is-over/ (Year: 2019).*

"International Search Report and Written Opinion Issued in PCT Application No. PCT/US2020/058991", dated Dec. 22, 2020, 11 Pages.

"Head to Head—Forza Horizon 4", Retrieved from: https://www.youtube.com/watch?v=iSgo01F2eSk, Jul. 1, 2019, 4 Pages.

"Racing Battle Royale", Retrieved from: https://play.google.com/store/apps/details?id=com.racings.battleroyale&hl=en, Retrieved Date: Jan. 3, 2020, 3 Pages.

Bedford, John, "PUBG Mobile: Royale Pass guide—Season 5, Rewards, Missions and Ranks", Retrieved from: https://www.metabomb.net/pubg/gameplay-guides/pubg-mobile-royale-pass-guide-season-5, Jan. 18, 2019, 16 Pages.

Holt, Kris, "'Forza Horizon 4' is getting a 72-car Battle Royale Mode", Retrieved from: https://www.engadget.com/2019-12-11-forza-horizon-4-battle-royale-mode.html, Nov. 12, 2019, 13 Pages.

Statt, Nick, "PUBG's New Smaller Island Map is a Direct Response to the Popularity of Fortnite", Retrieved from: https://www.theverge.com/2018/3/9/17100424/pubg-new-island-map-smaller-fortnite-battle-royale-popular-response, Mar. 9, 2018, 4 Pages.

Telfer, et al., "How Call of Duty Mobile left $100M on the Table", Retrieved from: https://www.deconstructoroffun.com/blog/2019/11/20/how-call-of-duty-mobile-left-100m-on-the-table, Nov. 20, 2019, 45 Pages.

"Need for Speed—High Stakes", Retrieved from: https://www.ign.com/faqs/2007/need-for-speed-high-stakes-walkthrough-785940. May 21, 2007, 38 Pages.

Allan, Darren, "Forza Horizon 4's Eliminator is a 72-player Battle Royale where you Race to the Death", Retrieved from: https://web.archive.org/web/20191212133858/https://www.techradar.com/news/forza-horizon-4s-eliminator-is-a-72-player-battle-royale-where-you-race-to-the-death, Dec. 12, 2019, 7 Pages.

Bardwell, Thomas, "Forza Horizon 4's Insanely Fun 72-Player Battle Royale Mode is Here", Retrieved from: https://www.ccn.com/forza-horizon-4s-insanely-fun-72-player-battle-royale-mode-is-here/, Dec. 12, 2019, 7 Pages.

\* cited by examiner

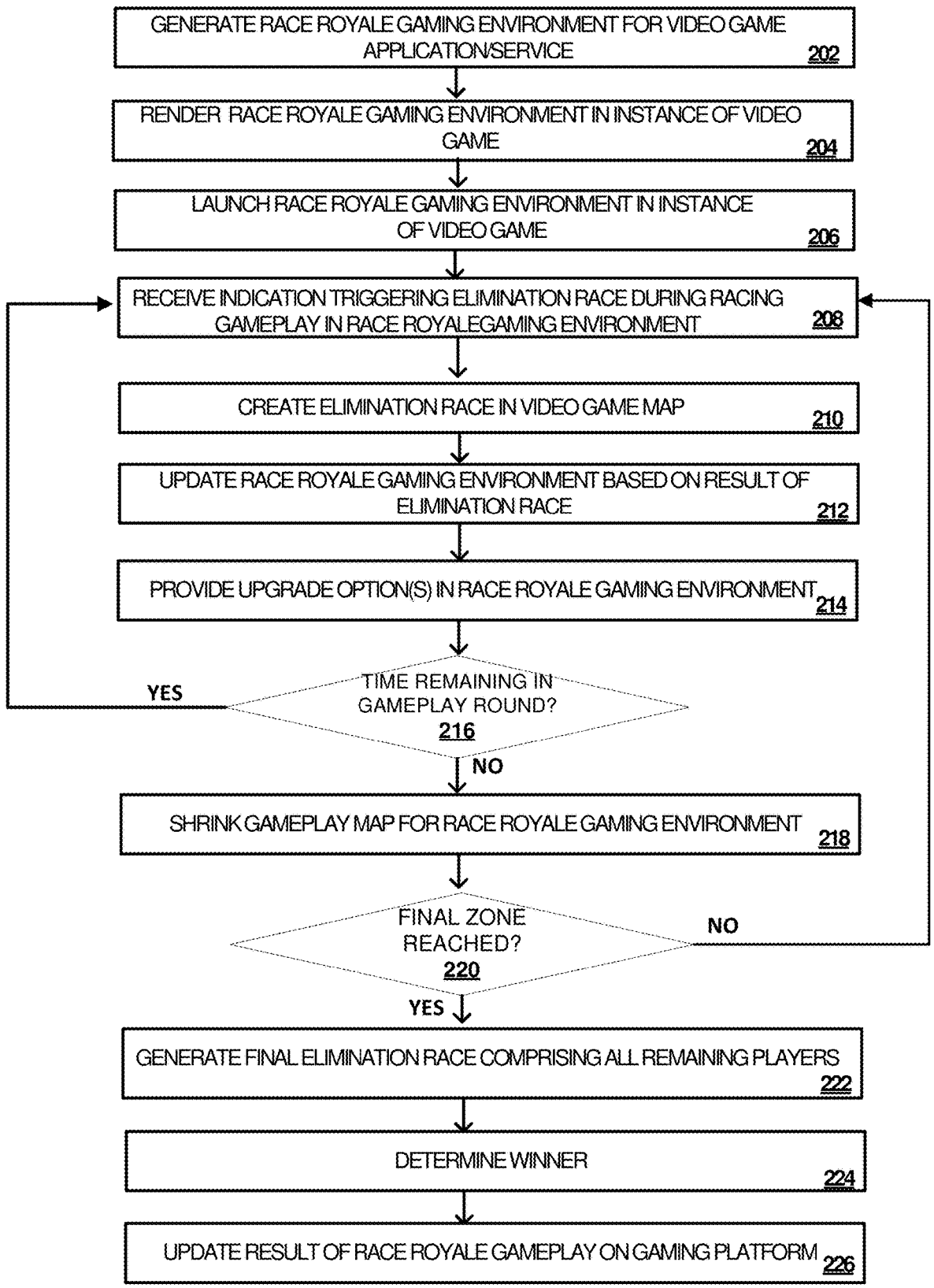

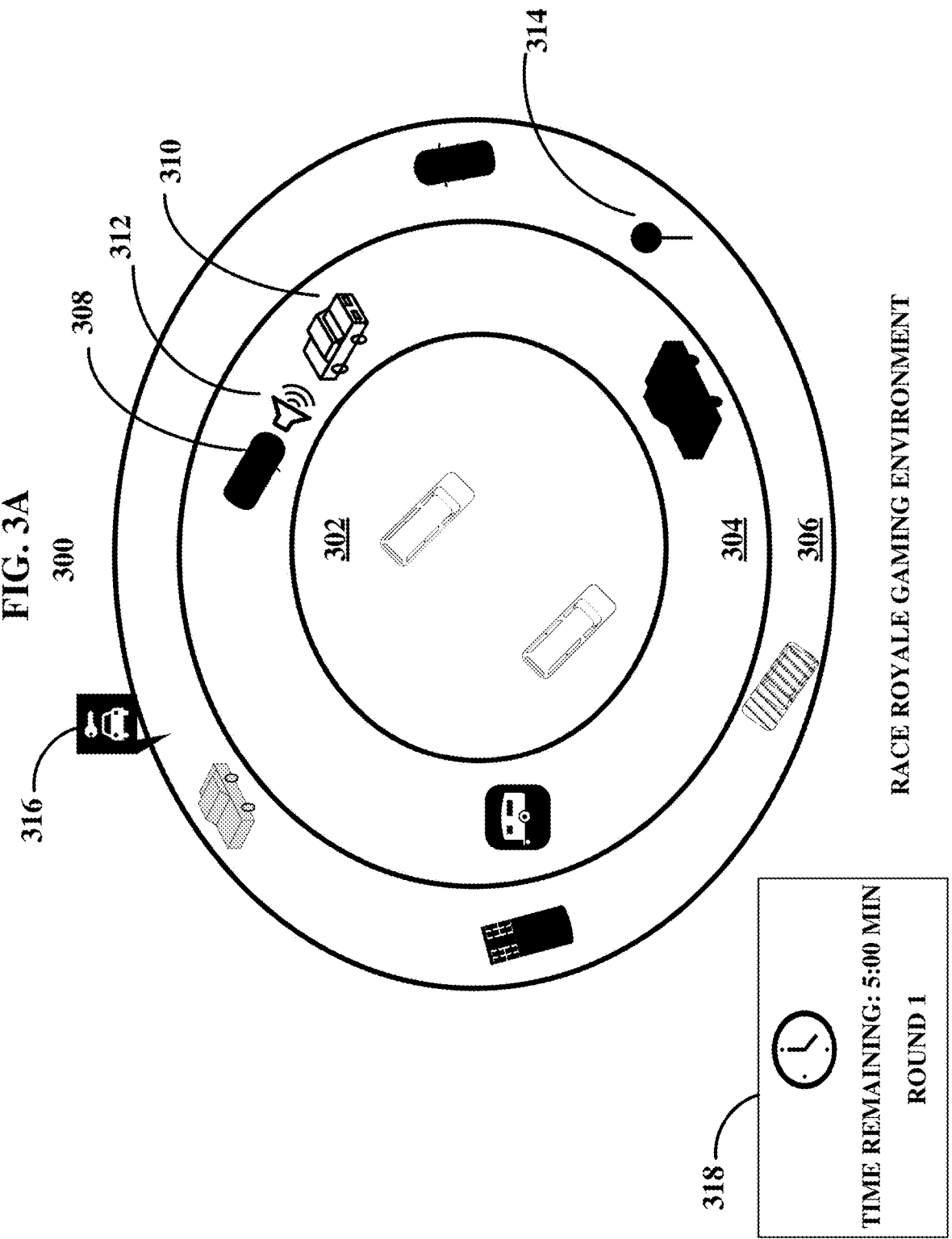

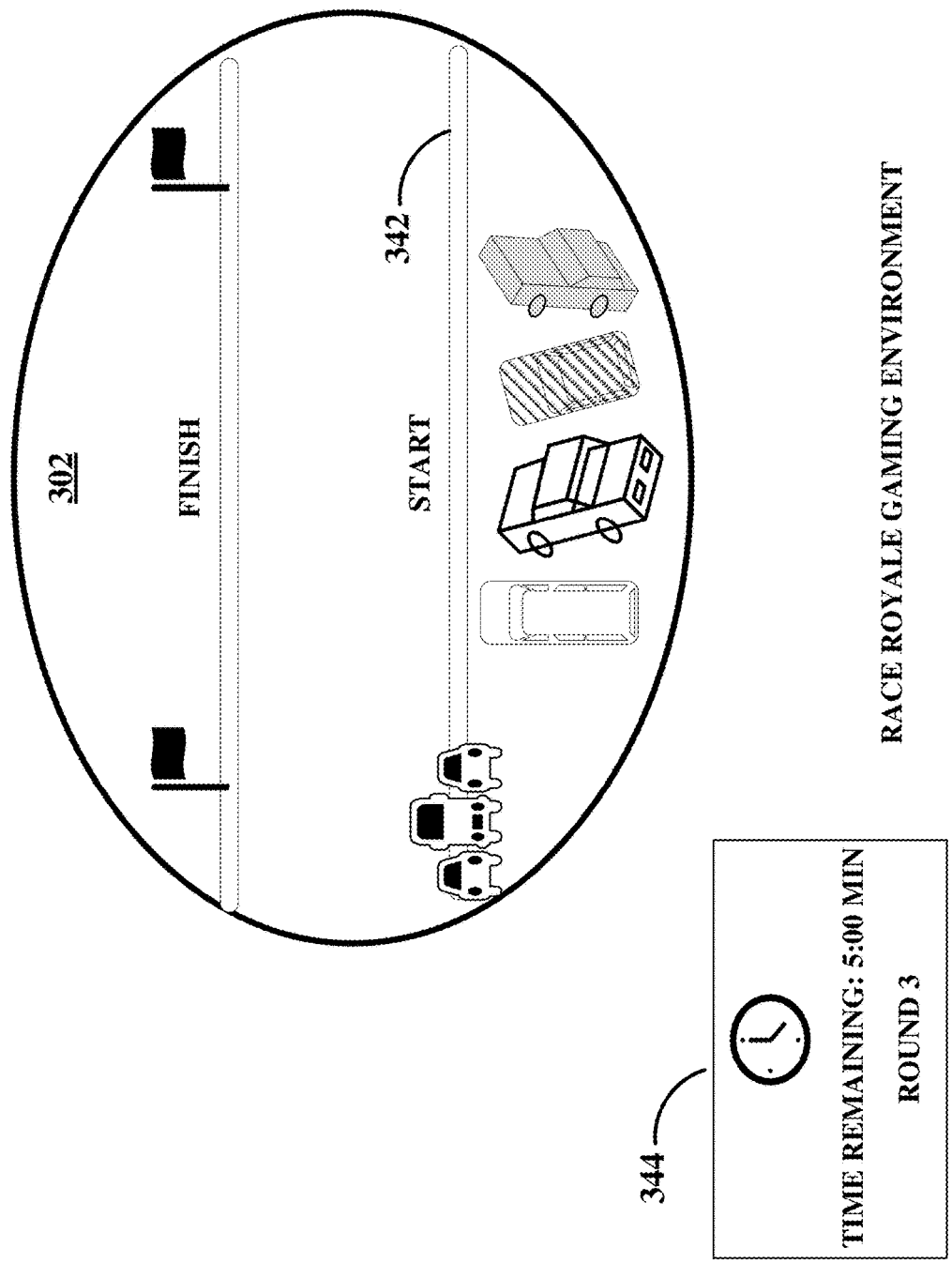

US 11,458,408 B2

RACE ROYALE GAMEPLAY THROUGH VIDEO GAME

CROSS-REFERENCE TO RELATED APPLICATIONS

This application claims priority to U.S. Provisional patent Application No. 62/946,279, entitled "RACE ROYALE GAMEPLAY THROUGH VIDEO GAME", filed on Dec. 10, 2019, which is incorporated by reference herein in its entirety.

BACKGROUND

Video game gameplay is an emerging technical field that is constantly evolving to harness the processing capabilities of gaming consoles and the appetite of gamers. Battle royale gameplay is traditionally rooted in shooting/fighting video games, where combatants fight until one fighter remains standing. However, this concept has not been applied to racing games that do not involve weapons and/or combat. While there are games that involve vehicles in battle royale-style gameplay, those games are either vehicular combat games (e.g., TWISTED METAL®) or a specific combat mode of a racing game (e.g., MARIO KART®). There is not a video game that features battle royale-style gameplay specifically configured for racing purposes. As such, existing video game gameplay and graphical user interfaces (GUIs) of video games featuring gameplay modes stand to be improved to enable battle royale gameplay in the novel ways described in the present disclosure. Technical factors that need to be considered for gameplay implementation include: necessary computer resources for implementation; processing efficiency; and video game usability (GUI representations), among other considerations.

Further, gaming consoles and gaming platforms (e.g., XBOX LIVE®), programmed for online multiplayer gaming and digital media delivery, provide another technical consideration when implementing new video games/video game modes. Technical components associated therewith need to be modified or updated to include new video games/gameplay functionality as well as provide user interfaces to integrate content. Thus, when a new type of video game (or update to a video game) is added to a gaming platform, technical considerations are required to be met to integrate the video game/gameplay mode into the gaming platform.

Moreover, large amounts of computing resources are needed to enable gamers to participate in an online multiplayer version of games. For instance, hundreds of players may be engaged may be participating in a complex video game map over network connections, which requires operation of an incredible amount of computing resources. Large amounts of data are required to be transmitted and processed to execute a multiplayer version of a video game, where better management of data can greatly improve gameplay experiences as well as enable organizations providing gameplay experiences to better manage computing resources required for such operation. As such, an aim of the present disclosure is to improve processing efficiency and reduce the amount of computing resources required as a multiplayer session (e.g., online multiplayer session) of a video game commences.

SUMMARY

In view of the foregoing technical challenges, the present disclosure relates to processing operations configured for generation and rendering of a race royale gaming environment that improves processing efficiency and overall racing gameplay in multiplayer scenarios. An exemplary race royale gaming environment provides a time-adjustable video game map configured to enable racing gameplay between a plurality of players (e.g., player-controlled vehicles) until an overall winner is determined. The race royale gaming environment is further configured to provide persistent vehicle upgrades that persist during at least one gaming instance of racing gameplay (e.g., one or more races) in the race royale gaming environment. In other examples, the race royale gaming environment is configured to enable a player to challenge one or more other players to an elimination race within the time-adjustable video game map. The race royale gaming environment may be configured to execute a predetermined number of rounds of gameplay that continuously shrinks/reduces the time-adjustable video game map during racing gameplay.

Further non-limiting examples of the present disclosure describe: execution of an exemplary race royale gaming environment; components configured to enable execution of the race royale gaming environment; specific processing operations executed during operation of the race royale gaming environment; and integration of race royale gameplay into a gaming platform, among other examples. Each of these technical aspects of the present disclosure further produce technical advantages that do not exist in traditional video game gameplay and further improve computing devices usable to generate and/or execute the race royale gaming environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exemplary method for generation and provision of a race royale gaming environment, with which aspects of the present disclosure may be practiced.

FIGS. 3A-3C illustrate visual diagrams highlighting execution of rounds of race royale gameplay in an exemplary race royale gaming environment as described herein, with which aspects of the present disclosure may be practiced.

DETAILED DESCRIPTION

Figure 1:
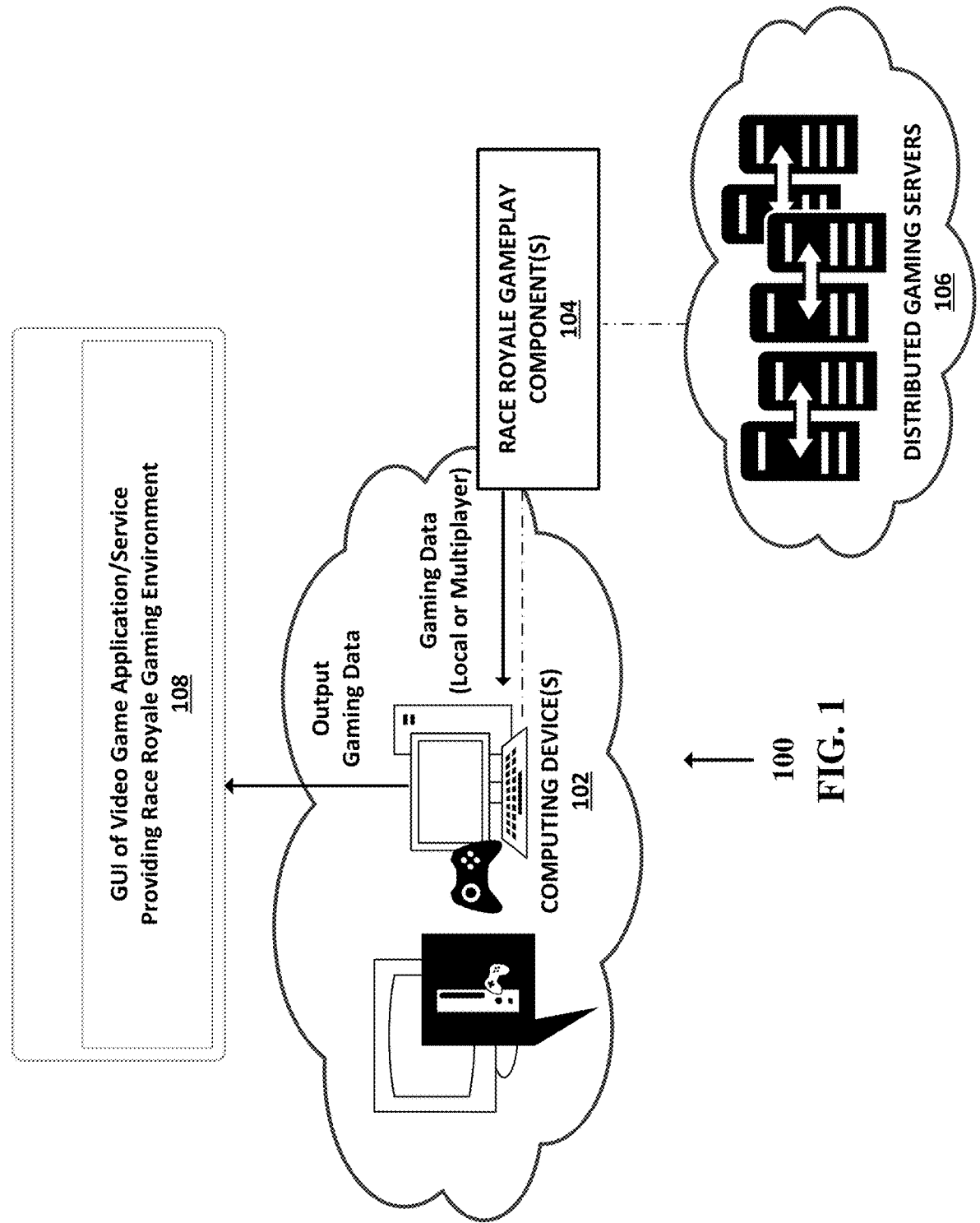
FIG. 1 illustrates an exemplary system diagram of components interfacing for execution of exemplary race royale gameplay as described herein, with which aspects of the present disclosure may be practiced.

As referenced above, the present disclosure relates to processing operations configured for generation and rendering of a race royale gaming environment that improves processing efficiency and overall racing gameplay in multiplayer scenarios. Multiplayer scenarios described herein include those where: a plurality of users (e.g., user accounts of a gaming platform) are competing against each other in an online multiplayer gaming instance of the race royale gaming environment; or one or more players (e.g., associated with a user account of a gaming platform) are computing against a plurality of artificial intelligence (AI) bots in an online or local gaming instance of the race royale gaming environment. A gaming instance of the race royale gaming environment may be a session (e.g., online or local) that comprises a plurality of players (e.g., live, AI bots or a combination thereof) engaged in a game or series of games of race royale gameplay occurring in one or more video game maps (e.g., time-adjustable video game maps). Race royale gameplay is racing gameplay specifically configured for the race royale gaming environment implementing features thereof. In one example, a gaming instance of the race royale gaming environment is a single game that comprises one or more rounds for racing gameplay. Within a gaming instance of the race royale gaming environment, there may be one or more instances of racing gameplay (e.g., one or more races) that occur between players to eliminate players from the field of play. Examples described herein further extend to those in which a video game is configured for functionality that enables and tracks multiple gaming instances of the race royale gaming environment in a cumulative fashion such as a video game campaign or tournament. In some examples of multiple gaming instances, generation of the race royale gaming environment may be configured to expose players to the same video game map. In other examples of multiple gaming instances, generation of the race royale gaming environment may be configured to expose players to different video game maps.

An exemplary race royale gaming environment provides a time-adjustable video game map configured to enable racing gameplay between a plurality of players (e.g., player-controlled vehicles) until an overall winner is determined. In some instances, a plurality of placement positions of race finishers within the race royale gaming environment may further be determined and recorded. In one example, the race royale gaming environment is configured to shrink/reduce a video game map (e.g., concentric circle map) to a smaller size after a predetermined amount of time elapses during racing gameplay and/or a predetermined number of participants are eliminated from the race royale gaming environment. For instance, generation of the race royale gaming environment may comprise setting one or more timed rounds for the racing gameplay that each coincide with a shrinking of a video game map (e.g., concentric circle map) as the racing gameplay commences. This improves processing efficiency for computing devices as gameplay continues, for example, by reducing the data required to be transmitted for rendering of the race royale gaming environment as a gaming instance thereof progresses, among other technical advantages. This also improves competition amongst competitors, improving overall racing gameplay, as participants are continuously experiencing a smaller and more competitive video game map to race within.

In further examples, the race royale gaming environment is configured to enable players to challenge one or more other players to an elimination race in order to eliminate players from race royale gaming environment as racing gameplay commences. This improves processing efficiency by reducing the field of players as racing gameplay commences, thereby further reducing the amount of data required to be transmitted for rendering of the race royale gaming environment as gameplay commences. It also improves gameplay and user experience while players participate in the race royale gaming environment by encouraging participant interaction and movement through the video game map. In one instance, the race royale gaming environment is configured to enable players to initiate one-on-one elimination races that enable the plurality of players (e.g., group or team or players), to challenge another player of the plurality of players to an elimination race within the time-adjustable video game map. However, in other examples, elimination races may comprise a plurality of players. Another form of elimination race that may exist within the race royale gaming environment is a final race (group race) that collectively comprises remaining players of the plurality of players as a round of gameplay or after completion of the one or more timed rounds. As an example, the final race may occur after many participants may have been eliminated during racing gameplay after a series of head-to-head elimination races, for example, that may have occurred in prior rounds of gameplay within the race royale gaming environment. In such an example, a winner (or a group of winners) of the final race may be an overall winner (or finishing/placement positions) of a gaming instance of the race royale gaming environment.

The race royale gaming environment is further configured to provide persistent vehicle upgrades that persist during at least one instance of racing gameplay in the race royale gaming environment. The persistent vehicles upgrades described herein are considered persistent because they are added to vehicles of players for the entirety of an instance of racing gameplay in the race royale gaming environment. This technical concept differentiates from traditional racing gameplay examples where players are equipped with temporary boosts, weapons, etc. An instance of racing gameplay may comprise one or more races within the race royale gaming environment, for example, until a player is eliminated or a winner (or winners) are determined. That is, a persistent vehicle upgrade may persist for one or more races within a gaming instance of the race royale gaming environment. For example, upgrades may be provided throughout racing gameplay (e.g., the entirety of the gaming instance of the race royale gaming environment) that may add upgrades to existing vehicles used for racing gameplay and/or enable players to upgrade/change/add vehicles that may be utilized throughout racing gameplay. In one example, persistent vehicle upgrades persist until they are replaced by another upgrade in an instance of race royale gameplay (or a subsequent instance of race royale gameplay). In some examples, players may be able to scroll through a collection of vehicles to choose from to utilize for racing gameplay, where persistent vehicle upgrades applied remain for that vehicle (e.g., until a player is eliminated from an instance of the race royale gaming environment). In other examples, a persistent vehicle upgrade may replace a current vehicle of a player with a new (upgraded) vehicle for subsequent racing gameplay. In some further examples, persistent vehicle upgrades may stay with a player even after an instance of the race royale gaming environment has concluded. For example, persistent vehicle upgrades may be configured to persist with user accounts during a campaign that spans more than one gaming instance/session of racing gameplay associated with a race royale gaming environment or multiple gaming instances of the race royale gaming environment.

Generation of the race royale gaming environment is further configured to provide one or more persistent vehicle upgrade options to a winner of an elimination race (e.g., one-on-one elimination race) during the racing gameplay and eliminate a loser of the elimination race from the at least one instance of the race royale gaming environment. This provides incentives for users to engage in elimination races during racing gameplay. In some examples, the one or more persistent vehicle upgrade options comprise a first option to add an enhancement to an existing vehicle of the winner of the elimination race and a second option to acquire a new vehicle to use during the racing gameplay. In other examples, persistent vehicle upgrades may be randomly applied (or preset by developers) as a result of winning an elimination race. In one example, the more elimination races that a player wins, the greater the persistent vehicle upgrades. This is another way that developers may encourage players to engage in elimination races. Moreover, the generating of the race royale gaming environment is further configured to enable the persistent vehicle upgrades to be presented at random locations in the time-adjustable video game map during commencement of the racing gameplay. For example, there may be random vehicle drops/upgrade drops at various locations throughout the time-adjustable video game map. This may further encourage players to engage within the time-adjustable video game map rather than hiding and avoiding interactions. In one example, randomized persistent vehicle upgrade drops may correspond with a state of the time-adjustable video game map, where a certain number of randomized persistent vehicle upgrade drops may occur within a specific round (e.g., timed round) of racing gameplay within the race royale gaming environment.

In further technical examples, a generated race royale gaming environment may be rendered for implementation within video game (e.g., provided by a video game application/service executing on a computing device or system of computing devices). For example, the race royale gaming environment is rendered for execution in a gaming instance of a racing video game. In one example, this may occur on a computing device that is configured to present a gaming instance of the race royale gaming environment within a video game, for example, a client gaming console that is executing the video game (e.g., racing video game). In other examples, the rendering may occur on one or more first computing devices (e.g., one or more servers) that is configured to initiate the race royale gaming environment, where data for the race royale gaming environment is transmitted for output to one or more second computing devices (e.g., a client gaming console and connected electronic devices for output of gaming content). In any example, one or more computing devices may be configured to execute programmed coding associated with operation of an exemplary race royale gaming environment. As an example, a race royale gaming environment is provided through a graphical user interface of a video executing on one or more computing devices.

Moreover, further non-limiting examples of the present disclosure relate to management of execution of race royale gameplay with a gaming platform (e.g., XBOX LIVE®). A gaming platform may be programmed for online multiplayer gaming and digital media delivery. For instance, a gaming platform may manage a plurality of gaming accounts to record results of new gameplay, keep records, update profiles, provide rewards/rankings, etc. In some examples, processing described herein is configured to automatically update a record on a gaming platform based on an outcome of a gaming instance of the race royale gaming environment. For example, update of a record may comprise any of: providing an indication of a result of race royale gameplay in a gaming instance of the race royale gaming environment; providing the overall winner and/or a subset of winners (or finishers) with a reward to its user account associated with the gaming platform; providing player rankings/XP, etc., to user accounts, providing message notification; and managing chat/messaging via the gaming platform, among other examples. In further examples, management of race royale gameplay may comprise adapting a gaming platform to enable initiation of race royale gameplay through the gaming platform and/or launching of video game campaigns and/or tournaments for race royale gameplay (e.g., ranked tournaments), among other examples.

Exemplary technical advantages provided by processing described in the present disclosure comprise but are not limited to: generation and rendering of an exemplary race royale gaming environment; integration of race royale gameplay components with computing devices to enable processing operations described herein including the generation and execution of a race royale gaming environment; improving processing efficiency (e.g., reduction in processing cycles, saving resources/bandwidth) for computing devices executing video games in multiplayer scenarios (e.g., improved gameplay for racing video games during multiplayer gaming online or local); reduction in latency during execution of multiplayer gaming (e.g., online multiplayer gaming); an improved GUI experience that presents content specific to an exemplary race royale gaming environment as well as related content on a gaming platform; and interoperability to enable data from a race royale gaming environment to be shared across a plurality of different applications/services to extend functionality and improve user experiences, among other technical advantages.

FIG. 1 illustrates an exemplary system diagram 100 of components interfacing for execution of exemplary race royale gameplay as described herein, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in method 200 (FIG. 2), processing associated with visual diagrams of FIGS. 3A-3C and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software application platform that also provides, to a component, access to and knowledge of other components that are associated with applications/services. In one instance, processing operations described in system diagram 100 may be implemented by one or more components connected over a distributed network.

System diagram 100 comprises one or more computing devices 102; one or more race royale gameplay components 104; distributed gaming servers 106 (e.g., of a distributed gaming platform); and a GUI of a video game application/service 108. Race royale gameplay may be implemented as part of an exemplary race royale gaming environment that is generated and rendered for presentation through a video game application/service. That is, a video game application/ service is configured to execute on computing device 102, for example, to present content associated with a video game application/service including content rendered for a race royale gaming environment. Race royale gameplay components 104 are configured to generate and render a race royale gaming environment for presentation through the video game application/service.

The one or more computing devices 102 may be one or more computing device that are configured for execution of application/services via any of software components, hardware components or a combination thereof. A user may be utilizing the one or more computing devices 102 to play a video game through a gaming application/service (e.g., video game application/service or gaming software platform that enables access to a plurality of video games). In one example, the one or more computing devices 102 of system diagram 100 are intended to cover examples where a user is accessing a video game through a gaming console that is connected with another output device that is configured to output gaming data transmitted by the gaming console to the output device for rendering and presentation. In some examples, the gaming console may be connected to one or more other output devices via a wired or wireless connection. An exemplary gaming console may be configured to executed video games stored locally on a hard drive (or via a computer-readable media executing thereon) of the gaming console or may access video game content that via a network connection (e.g., content that is stored and accessed on distributed data storage). In other examples, the one or more computing devices 102 of system 100 are also intended to cover examples where a user is executing a video game on a computing device that has integrated components (e.g., display, display component, audio component, processors) for output of gaming data. Gaming data such as content of video games may be run locally via the computing device or accessed over a network connection. In other alternative examples, system diagram 100 is further intended to cover technical examples where the one or more computing devices 102 are configured to output data received over a network connection, for example, where race royale gaming components 104 may be existing processing operations on the one or more distributed gaming servers 106 and subsequently transmitting gaming data for output to the one or more computing devices 102. Exemplary gaming data may comprise any and all of: sound data transmitted for output; display data transmitted for output; programmed operations for output of content associated with a race royale gaming environment including actions occurring during gameplay; data associated with a gaming platform that corresponds to execution of race royale gaming environment; network data associated with execution of a running video game (e.g., communications transmitted during gameplay such as a multiplayer game); and user-specific data (e.g., user identifying data users involved in communications), among other examples.

Race royale gameplay is racing gameplay specifically configured for the race royale gaming environment implementing features thereof, where the race royale gameplay components 104 are configured to execute processing to enable race royale gameplay. In doing so, race royale gameplay components 104 comprise one or more components (e.g., hardware, software or a combination thereof) that are configured to enable execution of programmed operations that generate, render and execute a race royale gaming environment to enable racing gameplay (e.g., race royale gameplay) through a video game (or a specific video game mode thereof). For example, the one or more race royale gameplay components 104 are configured to manage gaming data for execution of the race royale gaming environment on/across the one or more computing device 102. In some instances, the race royale gameplay components 104 may be configured as a software module or programmed processing component that executes processing operations described in the present disclosure related to generation, rendering and/or execution of a race royale gaming environment. This may occur through interfacing with a game engine configured to execute programmed code specific for the race royale gaming environment. Implementation of a game engine, including interfacing with the game engine, for rendering and execution of a video game is known to one skilled in the field of art. Above what is known, the present disclosure describes specific data that is programmed for implementation through a game engine that is uniquely configured to enable rendering and execution of the race royale gaming environment. In any example, the race royale gameplay components 104 may be configured to executed processing operations described in the foregoing description related to generation and rendering on a race royale gaming environment as well as processing operations described in method 200 (FIG. 2) and the accompanying description of visual diagrams of FIGS. 3A-3C. To enable rendering and presentation of a race royale gaming environment, the race royale gameplay components 104 transmit data (e.g., gaming data) that is processed by the one or more computing devices 102 to cause rendering and presentation of a GUI for a gaming application/service 208 that presents content associated with execution of a race royale gaming environment. A video game may be presented in a GUI layer that is presented through the GUI of the video game application/service 108.

System diagram 100 further comprises one or more distributed gaming servers 106. Distributed gaming servers 106 are configured to manage processing of gaming data to enable generation, rendering and execution of the race royale gaming environment. In one example, the one or more distributed gaming servers 106 may be a grouping of server devices configured to process data to enable execution of video games including processing to generate, render and/or execute the race royale gaming environment. However, the distributed gaming servers 106 may be any type of computing system, including data storage systems, as described in the description of FIG. 4.

The one or more distributed gaming servers 106 may be configured for processing to enable gaming instances of the race royale gaming environment to occur either locally or online over a network connection. In doing so, the one or more distributed gaming servers 106 may store data that, when executed by one or more processing components, enables an instance of a race royale gaming environment to be rendered. In some examples, the one or more distributed gaming servers 106 may be configured strictly for processing of gaming data related to the execution of an online session (e.g., online multiplayer session) of a video game, where a client gaming console may be used to access an instance of the race royale gaming environment via the one or more distributed gaming servers 106. In such technical instances, the distributed gaming servers 106 connect a plurality of different players (e.g., user accounts of players) in an online multiplayer session of the race royale gaming environment. The distributed gaming servers 106 may also be associated with a software platform that enable online execution of video games including processing to generate, render and/or execute the race royale gaming environment. In such examples, the distributed gaming servers 106 may further be configured to manage data (e.g., gaming data) for generation and rendering of a gaming platform, for example, that may provide users with access to their own user account associated with the gaming platform. As indicated in the foregoing description, a gaming platform may be improved over traditional gaming platforms by configuring the gaming platform for integration of data associated with instances of race royale gaming environments. Furthermore, the one or more distributed gaming servers 106 may be connected with other network-accessible computing resources (including data repositories storing data to enable execution of processing operations described herein). For example, a gaming platform may be provided by an organization that manages a software platform providing access to a plurality of different applications/services, thereby interfacing with those applications/services to extend functionality provided to users during operation of a race royale gaming environment.

As indicated in the foregoing description, a video game may be presented in a GUI layer that is presented through the GUI of the video game application/service 108. The GUI of the video game application/service 108 provides a user (e.g., player) with a rendering of the race royale gaming environment during execution of a gaming instance of the race royale gaming environment. A representation of a gaming instance, from a user perspective, may be generated and rendered via the one or more computing devices 102, thereby providing a client-focused representation of a gaming instance of the race royale gaming environment on a respective client computing device. In doing so, gaming data is output by the one or more computing devices 102 enabling generation and rendering of the GUI of the video game application/service 108 providing a gaming instance of the race royale gaming environment.

FIG. 2 illustrates an exemplary method 200 for generation and provision of a race royale gaming environment, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), plugins, neural networks and/ or machine-learning processing, among other examples. In one instance, processing operations described in method 200 may be implemented by one or more components connected over a distributed network. For example, components may be executed on one or more network-enabled computing devices, connected over a distributed network, that enable generation and/or execution of a race royale gaming environment (e.g., provided through a video game application/ service). In other instances, a race royale gaming environment may be generated and executing locally (e.g., offline) on a computing device. In other instances, results of offline gameplay may be synchronized with a gaming platform at a later point in time when a computing device establishes a network connection and is connected with a gaming platform.

Method 200 begins at processing operation 202, where an exemplary race royale gaming environment is generated. As indicated in the foregoing description, including the description of system diagram 100 (FIG. 1), the race royale gaming environment may be generated through processing executed by the race royale gameplay components 104. Said race royale gameplay components 104 may be executing on a distributed processing component (e.g., server of the one or more distributed servers 106 of FIG. 1), a local processing component (e.g., component executing on a computing device of the one or more computing devices 102) or a combination thereof. In one example, generation of the race royale gaming environment occurs via a software module executing a programmed set of executable instructions that is configured to generate and render the race royale gaming environment for execution in a video game (e.g., racing video game) as a stand-alone video game or gameplay mode within a video game. This may occur through interfacing with a game engine configured to execute programmed code specific for the race royale gaming environment. In some examples, race royale components are components Implementation of a game engine, including interfacing with the game engine, for rendering and execution of a video game is known to one skilled in the field of art. Above what is known, the present disclosure describes specific data that is programmed for implementation through a game engine that is uniquely configured to enable rendering and execution of the race royale gaming environment.

Processing operation 202 comprises generating a gaming instance (or gaming instances) of a race royale gaming environment. An exemplary race royale gaming environment provides a time-adjustable video game map configured to enable racing gameplay between a plurality of players (e.g., player-controlled vehicles) until an overall winner is determined. Generation (processing operation 202) of a race royale gaming environment may comprise generating one or more gaming instances of the race royale gaming environment. A gaming instance of the race royale gaming environment may be a session (e.g., online or local) that comprises a plurality of players (e.g., live, AI bots or a combination thereof) engaged in a game or series of games of race royale gameplay occurring in one or more video game maps (e.g., time-adjustable video game maps). In one example, a gaming instance of the race royale gaming environment is a single game that comprises one or more rounds for racing gameplay. Within a gaming instance of the race royale gaming environment, there may be one or more instances of racing gameplay (e.g., one or more races) that occur between players to eliminate players from the field of play. Examples described herein further extend to those in which a video game is configured for functionality that enables and tracks multiple gaming instances of the race royale gaming environment in a cumulative fashion such as a video game campaign or tournament. In some examples, a tournament comprising a plurality of gaming instances of a race royale gaming environment may be generated and then executed concurrently. Developers may configure a number of different game modes for generating and rendering the race royale gaming environment including but not limited to: a single game mode; a campaign mode; a tournament-style mode; and a series mode (e.g. that comprises a set number of games/matches that a plurality of players compete in), among other examples. In some examples, a GUI of a racing video game may be configured to enable users to provide selects as to a gameplay mode, where generating of gaming instances of a race royale gaming environment may occur based on user selection.

Generation (processing operation 202) of the race royale gaming environment may comprise selecting data for selecting and initializing a video game map. Generation processing may comprise selecting a video game map for racing gameplay within the race royale gaming environment. The video game map is the total space available to a player during the course of completing pre-configured racing royale gameplay. Developers may generate a variety of different video game maps for launching of a race royale gaming environment without departing from the spirit of the present disclosure. In some instances, a race royale gaming environment may comprise a plurality of different video game maps. For example, a race royale gaming environment may be configured to enable players to compete in a plurality of different gaming rounds, where a change in a round of racing gameplay may be a trigger for changing a video game map. In other examples, generation of a gaming instance is set to enable players to compete in a single video game map. Developers may generate a predetermined listing of video game maps (e.g., tracks), providing a closed environment where players are free to roam to compete in racing gameplay. In one example, generation of the race royale gaming environment may comprise randomly selecting a video game map. However, a video game may be configured to enable users to select a specific video game map for a gaming instance of the race royale gaming environment.

Generation (processing operation 202) may further comprise setting parameters for adjustment of a video game map. As indicated in the foregoing description, a video game map may be configured as a time-adjustable video game map configured to enable racing gameplay between a plurality of players (e.g., player-controlled vehicles) until an overall winner is determined. In one example, the race royale gaming environment is configured to shrink/reduce a video game map (e.g., concentric circle map) to a smaller size after a predetermined amount of time elapses during racing gameplay and/or a predetermined number of participants are eliminated from the race royale gaming environment. For instance, generation of the race royale gaming environment may comprise setting one or more timed rounds for the racing gameplay that each coincide with a shrinking of a video game map (e.g., concentric circle map) as the racing gameplay commences and/or how much/when to shrink a video game map during racing gameplay. This improves processing efficiency for computing devices as gameplay continues, for example, by reducing the data required to be transmitted for rendering of the race royale gaming environment as a gaming instance thereof progresses, among other technical advantages. This also improves competition amongst competitors, improving overall racing gameplay, as participants are continuously experiencing a smaller video game map to race within. While one example of a time-adjustable video game map is a concentric circle map (e.g., closed concentric circle map), the time-adjustable video game map may be configured in any shape or dimension without departing from the spirit of the present disclosure.

Moreover, generation (processing operation 202) of the race royale gaming environment may further comprise configuring the time-adjustable video game map for racing gameplay. This may comprise selecting pre-configured racing structure as to how players compete in the racing royale gaming environment. The race royale gaming environment is configured to enable players to challenge one or more other players to an elimination race in order to eliminate players from race royale gaming environment as racing gameplay commences. This improves processing efficiency by reducing the field of players as racing gameplay commences, thereby further reducing the amount of data required to be transmitted for rendering of the race royale gaming environment as gameplay commences. It also improves gameplay and user experience while players participate in the race royale gaming environment by encouraging participant interaction and movement through the video game map. In one instance, the race royale gaming environment is configured to enable players to initiate one-on-one elimination races that enable the plurality of players, to challenge another player of the plurality of players to an elimination race within the time-adjustable video game map. However, in other examples, elimination races may comprise a plurality of players. Another form of elimination race that may exist within the race royale gaming environment is a final race (e.g., group race, collective race of remaining players) that collectively comprises remaining players of the plurality of players as a round of gameplay or after completion of the one or more timed rounds. As an example, the final race may occur after many participants may have been eliminated during racing gameplay after a series of head-to-head elimination races, for example, that may have occurred in prior rounds of gameplay within the race royale gaming environment. In such an example, a winner (or a group of winners) of the final race may be an overall winner (or finishing/placement positions) of a gaming instance of the race royale gaming environment. However, in other examples, the generating (processing operation 202) of the race royale gaming environment may comprise generating a gaming instance that comprises a plurality of gameplay rounds where each round is a final race of all players remaining in the race royale gaming environment. In one such example, a series of rounds of gameplay may each feature a final race that occurs in a time-adjustable video game map, where a set number of players is configured to advance to a subsequent round of gameplay based on race results continuously reducing the field of players until an overall winner is determined.

Generation (processing operation 202) of the race royale gaming environment is further configured to set parameters pertaining to enablement of persistent vehicle upgrades in the race royale gaming environment. Persistent vehicle upgrades persist during at least one instance of racing gameplay in the race royale gaming environment. The persistent vehicles upgrades described herein are considered persistent because they are added to vehicles of players for at least the entirety of an instance of racing gameplay in the race royale gaming environment. This technical concept differentiates from traditional racing gameplay examples where players are equipped with temporary boosts, weapons, etc. An instance of racing gameplay may comprise one or more races within the race royale gaming environment, for example, until a player is eliminated or a winner (or winners) are determined. That is, a persistent vehicle upgrade may persist for one or more races within a gaming instance of the race royale gaming environment. In some alternative examples, persistent vehicle upgrades persist until they are replaced with another persistent vehicle during one or more race royale gaming instances. In some cases, an instance of racing gameplay is the entirety of the racing gameplay in a race royale gaming environment. During racing gameplay, players may have the option to maintain usage of a vehicle that maintains persistent vehicles upgrades or possibly switch/upgrade to another vehicle during subsequent gameplay (e.g., when a persistent vehicle upgrade is capture or earned). Upgrades may be provided throughout racing gameplay (e.g., the entirety of the gaming instance of the race royale gaming environment) that may add upgrades to existing vehicles used for racing gameplay and/or enable players to upgrade/change/add vehicles that may be utilized throughout racing gameplay. In some examples, players may be able to scroll through a collection of vehicles to choose from to utilize for racing gameplay, where persistent vehicle upgrades applied remain for that vehicle (e.g., until a player is eliminated from an instance of the race royale gaming environment). In other examples, a persistent vehicle upgrade may replace a current vehicle of a player with a new (upgraded) vehicle for subsequent racing gameplay. In some further examples, persistent vehicle upgrades may stay with a player even after an instance of the race royale gaming environment has concluded. For example, persistent vehicle upgrades may be configured to persist with user accounts during a campaign that spans more than one gaming instance/session of racing gameplay associated with a race royale gaming environment or multiple gaming instances of the race royale gaming environment. Generation (processing operation 202) of the race royale gaming environment may comprise selecting, how persistent vehicle upgrades may manifest during execution of the race royale gaming environment. In some instances, this may comprise loading pre-configured computer code that enables provision of persistent vehicle upgrades in different contexts including but not limited to: provision of persistent vehicle upgrades based on results of elimination races; whether to provide persistent vehicle upgrades at drop locations within the time-adjustable video game map; types of persistent vehicle upgrades/upgrade options to enable during a gaming instance (e.g., this may depend on the type of gaming instance, the players involved including rank, XP, and/or achievements of players); and a determination as how the persistent vehicle upgrades persist (e.g., do the upgrades persist for one or more gaming instances), among other examples.

In some examples, generation (processing operation 202) may further comprise loading user profiles that comprise a collection of one or more vehicles for gameplay usage in the race royale gaming environment. For instance, experience and earned rewards may affect vehicles in which a user may be able to utilize during a gaming instance of the race royale gaming environment. In other examples, generation (processing operation 202) may comprise selecting a predetermined vehicle listing that players can utilize to select a starting vehicle once the race royale gameplay commences. In some alternative examples, a starting vehicle is randomly selected for a player.

Generation (processing operation 202) of the race royale gaming environment is further configured to set parameters associated with elimination races occurring during race royale gameplay. For instance, data may be loaded for gameplay execution within the race royale gaming environment, where the data loaded may comprise data providing: indication of types of elimination races (e.g., head-to-head elimination race; group elimination race, final race) occurring in a gaming instance; rules associated with execution of an elimination race and determination of winner; types of persistent vehicle upgrade options provided to users; and when a user is eliminated (e.g., after losing one or more elimination races), etc., among other examples. In one example, generation processing may comprise selecting one or more persistent vehicle upgrade options that is providable to a winner of an elimination race (e.g., one-on-one elimination race) during the racing gameplay. This provides incentives for users to engage in elimination races during racing gameplay. In some examples, the one or more persistent vehicle upgrade options comprise a first option to add an enhancement to an existing vehicle of the winner of the elimination race and a second option to acquire a new vehicle to use during the racing gameplay. In other examples, persistent vehicle upgrades may be randomly applied (or preset by developers) as a result of winning an elimination race. In one example, the more elimination races that a player wins, the greater the persistent vehicle upgrades. This is another way that developers may encourage players to engage in elimination races.

Moreover, the generating of the race royale gaming environment is further configured to enable the persistent vehicle upgrades to be presented at random locations in the time-adjustable video game map during commencement of the racing gameplay. As such, generation (processing operation 202) of the race royale gaming environment may comprise loading code that enables randomized persistent vehicle upgrades to be periodically provided at random locations within a time-adjustable video game map. This may further encourage players to engage within the time-adjustable video game map rather than hiding and avoiding interactions. In one example, randomized persistent vehicle upgrade drops may correspond with a state of the time-adjustable video game map, where a certain number of randomized persistent vehicle upgrade drops may occur within a specific round (e.g., timed round) of racing gameplay within the race royale gaming environment.

Furthermore, generation (processing operation 202) of the race royale gaming environment is configured to set parameters for racing gameplay (e.g. race royale gameplay). Some examples of parameters of race royale gameplay have already been described including setting of an adjustable video game map; settings for elimination races; and management of persistent vehicle upgrades. Other examples of parameters that may be set during generation processing (processing operation 202) comprise but are not limited to: how a video game map is selected (e.g., randomly); the number of players in a gaming instance; the number of rounds of racing gameplay in a gaming instance; the time allotment for each round of racing gameplay in a gaming instance; when and how much a video game map is adjusted; whether additional players may be added to a gaming instance; how many winners are selected (e.g., win-place-show, single overall winner); and rewards for winning a gaming instance, among other examples. In some examples, the race royale gaming environment may be configured with a pre-determined number of players to compete within the time-adjustable video game map. In one example, players may connect with a distributed gaming server providing to fill a spot for a specific gaming instance of the race royale gaming environment via an online multiplayer gaming session. In instances where not enough players select to compete in the race royale gaming environment (i.e., the predetermined number of spots are not completely filled), AI bots may be generated and utilized as players to ensure that the predetermined number of players are competing in the race royale gaming environment. However, some gaming instances may be configured to disable the usage of AI bots. In some examples, parameters may be pre-determined, where generating (processing operations 202) loads the preset parameters for execution of the race royale gameplay environment. In other examples, parameters of racing gameplay may be variable determined based on any factors including but not limited to: the number of players competing in the race royale gaming environment; whether users provided a manual indication for specific parameters; status (e.g., rank, XP, etc.) associated with user account; and a type of gaming instance being generated (e.g., single gaming instance, multiple gaming instances).

Once parameters for generation of the race royale gaming environment have been established, flow of method 200 may proceed to processing operation 204, where the race royale gaming environment is rendered in an instance of a video game. Rendering (processing operation 204) may occur based on the generating (processing operation 202) of the race royale gaming environment. As indicated in the foregoing description, a game engine may be configured to render and implement execution of an exemplary race royale gaming environment. In some examples, rendering (processing operation 204) may comprise execution of a game engine either locally or on a distributed computing device (e.g., distributed gaming server) depending on the type of gaming instance being launched (e.g., online or local gameplay).

At processing operation 206, the race royale gaming environment is launched to initiate execution of race royale gameplay. Initiation (processing operation 206) may comprise launching the race royale gaming environment within an executing video game that is executing locally, over a distributed computing device or a combination thereof, for example, based on the generated and rendered race royale gaming environment. In gaming instances where players are participating in an online multiplayer version of the race royale gaming environment, the race royale gaming environment may be launched on a distributed computing device (e.g., distributed gaming server) and data subsequently transmitted to a player' client device (e.g., gaming console, computer) to enable race royale gameplay in a launched gaming instance of the race royale gaming environment. A client device (e.g., client gaming console or other computing device) may be used for launching of a client representation of a race royale gaming environment. As indicated in the foregoing description of system diagram 100 (FIG. 1), initiation of the race royale gaming environment comprises rendering a GUI of a video game application/service that provides a GUI for the race royale gaming environment. Launching (processing operation 206) of the race royale gaming environment further comprises processing operation including but not limited to: rendering a video game map (e.g., a time adjustable video game map) including a plurality of players (e.g., a vehicle associated with a respective player); starting one or more rounds of race royale gameplay; and initiating a timer for the one or more rounds of race royale gameplay, among other examples.

As race royale gameplay is executing, flow of method 200 may proceed to processing operation 208. At processing operation 208, an indication is received (or detected) triggering an elimination race during the race royale gameplay in the race royale gaming environment. As indicated in the foregoing, the race royale gaming environment may be configured to enable elimination races (e.g., head-to-head or multiple players) to occur during race royale gameplay. The race royale gaming environment may be further configured to receive or detect a trigger for initiation of said an elimination race. Receipt of a trigger may be identified based on an evaluation of gaming data transmitted during execution of a gaming instance of the race royale gaming environment. Methods for analyzing gaming data during execution of a video game is known to one skilled in the field of art. Above what is known, the present disclosure is configured to identify a specific trigger occurring in a round of game (e.g., a timed round of gameplay) during execution of the race royale gameplay and subsequently initiate a response that is specific to race royale gameplay. A trigger for detecting an elimination race may be initiated in technical instances including but not limited to: through one or more actions initiated by a player during race royale gameplay; based on realization of a milestone within a gaming instance of the race royale gaming environment; and based on completion of one or more rounds of the race royale gameplay, among other examples.

In an example where a player intends to challenge another player in an elimination race, a trigger may be commensurate to signify a user intent to minimize instances where a player inadvertently triggers an elimination race. For instance, a trigger may require that multiple actions occur concurrently, for example, where: 1) a focus of a player, in a GUI representation of the race royale gaming environment, is on another player of the during the race royale gameplay; and 2) that concurrently with the focus on the other player, the player executes an additional action signifying an indication to initiate an elimination race (e.g., head-to-head elimination race). That is, an indication to initiate an elimination race is received when an in-game action occurs concurrently while a vehicle of a player is focused on a vehicle of another player in a GUI representation. This example is intended to illustrate that initiation of an elimination race by a player is most likely an intended action. Otherwise, head-to-head elimination races may be avoided by players. It is to be understood that the above example is only one type of recognition of an indication. Other types of indications may be programmed into the race royale gameplay by developers and recognized as indications without departing from the spirit of the present disclosure. In some instances, players may hide in areas of the time-adjustable video game map to avoid the risk of being eliminated in an elimination race. This is another reason why the video game map may be time-adjustable, requiring players to engage with other players during race royale gameplay. Head-to-head elimination races may occur at any time during a round of gameplay, where the head-to-head elimination race may specifically occur between two players. However, as other players are present during execution of the race royale gaming environment, other players may affect the outcome of the head-to-head elimination race such as crashing into vehicles of players, creating obstacles, etc. In some further examples where players are grouped in teams within the race royale gaming environment, receipt of a trigger that challenges one player from a team of players may automatically be included in an elimination race.

At processing operation 210, execution of the race royale gaming environment is configured to create an eliminate race between said players (e.g., a head-to-head elimination race) within the video game map. Processing operation 210 may occur based on the receipt of the indication to initiate the elimination race. In examples where multiple head-to-head elimination races are triggered, processing operation 210 may create elimination races for each indication received. Creating (processing operation 210) the elimination race may comprise creating one or more points of reference for the elimination race (e.g., a starting point and an end point) within the video game map. The end point may be set so that the players have to cover a minimum or threshold distance within the video game map. In one example, an end point for an elimination race may be randomly set with the video game map.

Creation (processing operation 210) of the elimination race may further comprise: generating graphical indicators for presentation through a GUI of the race royale gaming environment to help guide players engaged in an elimination race. Examples of such graphical indicators comprise but are not limited to graphical indicators for: a starting point and an end point; checkpoints during the elimination race; locational indicators of players engaged in the elimination race; and a map for guidance during the elimination race, among other examples. Moreover, creation (processing operation 210) of the elimination race may further comprise initiating the elimination race between applicable players. This may further include updating a GUI representation of the race royale gaming environment to display graphical indicators corresponding with the elimination race and starting the elimination race between players within the race royale gaming environment.

Flow of method 200 may then proceed to processing operation 212, where the race royale gaming environment is updated based on a result of the elimination race. Processing operation 212 may comprise identifying a winner (or winners) and a loser (or losers) of the elimination race. Based on the identifying, a loser may be eliminated from the race royale gameplay. The winner remains as an active participant in the race royale gameplay.

Flow of method 200 may proceed to processing operation 214, which comprises providing a persistent vehicle upgrade option in the race royale gaming environment. Processing operation 214 may comprise rendering a vehicle upgrade option and providing the vehicle upgrade option through a GUI representation of the race royale gaming environment. A player may execute a selection of a vehicle upgrade option (or alternatively decline the upgrade options), which then results in update to the race royale gaming environment to apply a persistent vehicle upgrade to the player. In one example, processing operation 214 comprises providing a winner of the elimination race with a persistent vehicle upgrade option. In other examples, persistent vehicle upgrades may be dropped at random locations with the video game map, where processing operation 214 may comprise initiating a drop of a persistent vehicle upgrade. That is, players may be provided with the option to select the randomly dropped vehicle upgrade or ignore it (e.g., by avoiding contact with a GUI indication of the persistent vehicle upgrade in the video game map). Examples of persistent vehicle upgrades and provision of options for persistent vehicles upgrades have been described in the foregoing description.

At decision operation 216, it is determined whether there is time remaining in a round of gameplay. In examples where it is determined that time remains, processing of decision operation 216 branches NO and processing of method 200 returns back to processing operation 208, continuing to receive/detect indicators for triggering elimination races. In examples where it is determined that no time remains in a round of gameplay, processing of decision operation 216 branches YES and processing of method 200 proceeds to processing operation 218.

At processing operation 218, the video game map (e.g., the time-adjustable video game map) is shrunk/reduced to create an updated race royale gaming environment. As indicated in the foregoing description, the video game map may be shrunk/reduced during one or more rounds of game (e.g., timed rounds of race royale gameplay). This may occur automatically based on the configuration of the race royale gaming environment initially set during the generation as well as subsequent execution of code to realize said configuration during execution of race royale gameplay. In one example, the video game map (e.g., the time-adjustable video game map) is shrunk/reduced a predetermined amount based as programmed by developers. The amount of modification may vary without departing from the spirit of the present disclosure. However, in some alternative examples, shrinking/reduction of the video game map may occur based on other factors indicating a context of the race royale gameplay, for example, the number of players remaining in the race royale gameplay (e.g., after completion of a round of gameplay). In such examples, a contextual determination may occur based on analysis of gaming data during race royale gameplay, where the race royale gaming environment may be adjusted to keep pace with the gameplay results. As indicated in the foregoing description, the video game map may be configured to be shrunk/reduced with completion of each round of gameplay. However, in alternative examples, a predetermined number of modifications to the video game map may be configured to occur.

Continuing method 200, at decision operation 220, it is determined whether a final zone has been reached for the race royale gaming environment, for example, based on reduction of the video game map. In examples where it is determined that a final zone has not been reached, processing of decision operation 218 branches NO and processing of method 200 returns back to processing operation 208 to continue the race royale gameplay. As previously described, processing operation 208 comprises detecting elimination races occurring in the race royale gaming environment during race royale gameplay. In examples where it is determined that the final zone has been reached, processing of decision operation 220 branches YES and processing of method 200 proceeds to processing operation 222.

At processing operation 222, a final elimination race is generated that collectively comprises all remaining players in the race royale gaming environment. The final elimination race is a way to effectively determine an overall winner of a gaming instance of the race royale gaming environment while improving gameplay by providing a different challenge aspect of racing gameplay. In some alternative examples of gaming instances of a race royale gaming environment, a final elimination race may not occur, instead requiring players to eliminate all other remaining players through elimination races as previously described. However, in examples where a final elimination race is a component of a gaming instance the race royale gaming environment, the final elimination race may be triggered to automatically occur upon detecting, through analysis of the gaming data, that a predetermined number of rounds of race royale gameplay have been completed and/or a specific number of players actively remain in the race royale gameplay.

Processing operation 222 may comprise rendering one or more points of reference for the final elimination race (e.g., a starting point and an end point) within the video game map. In one example, creating of the final elimination race may comprise execution of processing operations to align remaining players at the same starting point within the video game map. In alternative examples, the final elimination race may require players to cover a specific distance within the video game map, where starting points and ending points for the final elimination race may vary player to player. As such, it is to be recognized that a starting point and an ending point for the final race may be set in any manner without departing from the spirit of the present disclosure. In one example, an end point for an elimination race may be randomly set with the video game map.

Processing operation 222 may further comprise generating graphical indicators for presentation through a GUI of the race royale gaming environment to help guide players engaged in the final elimination race. Examples of such graphical indicators comprise but are not limited to graphical indicators for: a starting point and an end point; checkpoints during the final elimination race; locational indicators of players engaged in the final elimination race; and a map for guidance during the final elimination race, among other examples. Moreover, processing 222 may further comprise initiating the final elimination race between applicable players. This may further include updating a GUI representation of the race royale gaming environment to display graphical indicators corresponding with the final elimination race and starting the final elimination race between remaining players within the race royale gaming environment.

At processing operation 224, a winner of the final elimination race is determined. Processing operation 224 may comprise determining an overall winner of the gaming instance for the race royale gaming environment and/or placement positions of other participants in the race royale gameplay. In alternative examples, where a final elimination race did not take place, a winner of the final elimination race is determined based on results of a series of elimination races (e.g., head-to-head elimination races). A number of winners and/or distribution of rewards, XP, etc., may be preset before execution of a gaming instance, for example, when a gaming instance of the race royale game environment is generated. Results of the race royale gameplay, through analyzing the gaming data, may be utilized to determine an outcome of race royale gameplay and identify the one or more winners of the race royale gaming environment. Processing operation 224 may further comprise rendering results of the race royale gameplay through a GUI of a video game, where results of the race royale gameplay may then be presented to users through the GUI of the video game.

At processing operation 226, a result of the race royale gameplay is updated (e.g., in the video game) on a gaming platform. As indicated in the foregoing description, a gaming platform may be programmed for online multiplayer gaming and digital media delivery. Specifically, the gaming platform may be an online service that manages gaming content and associated data for users. The gaming platform may be specifically adapted to provide gaming instances associated with a race royale gaming environment as well as manage content associated with the same. Management of race royale gameplay may comprise adapting a gaming platform to enable initiation of gaming instances of a race royale gaming environment through the gaming platform including provision of video game campaigns and/or tournaments for race royale gameplay (e.g., ranked tournaments), among other examples. For instance, a gaming platform may manage a plurality of gaming accounts to record results of new gameplay, keep records, update profiles, provide rewards/rankings, etc., as well as provide gaming content and access to gaming content for users to access through a client computing device (e.g., client gaming console). Users may connect to a gaming platform through a network connection, where a user may register a user account with the gaming platform. The user account may be utilized to track gameplay including race royale gameplay in gaming instances of the race royale gaming environment. Processing operation 226 may comprise automatically updating a record on a gaming platform based on an outcome of a gaming instance of the race royale gaming environment. For example, updating of a record may comprise any of: providing an indication of a result of race royale gameplay in a gaming instance of the race royale gaming environment; providing an update to a user account with result, record, etc., pertaining to user participate in gaming instances of a race royale gaming environment; providing the overall winner and/or a subset of winners (or finishers) with a reward to its user account associated with the gaming platform; providing player rankings/XP, etc., to user accounts, providing message notification; and managing chat/messaging via the gaming platform, among other examples.

Figure 3B:
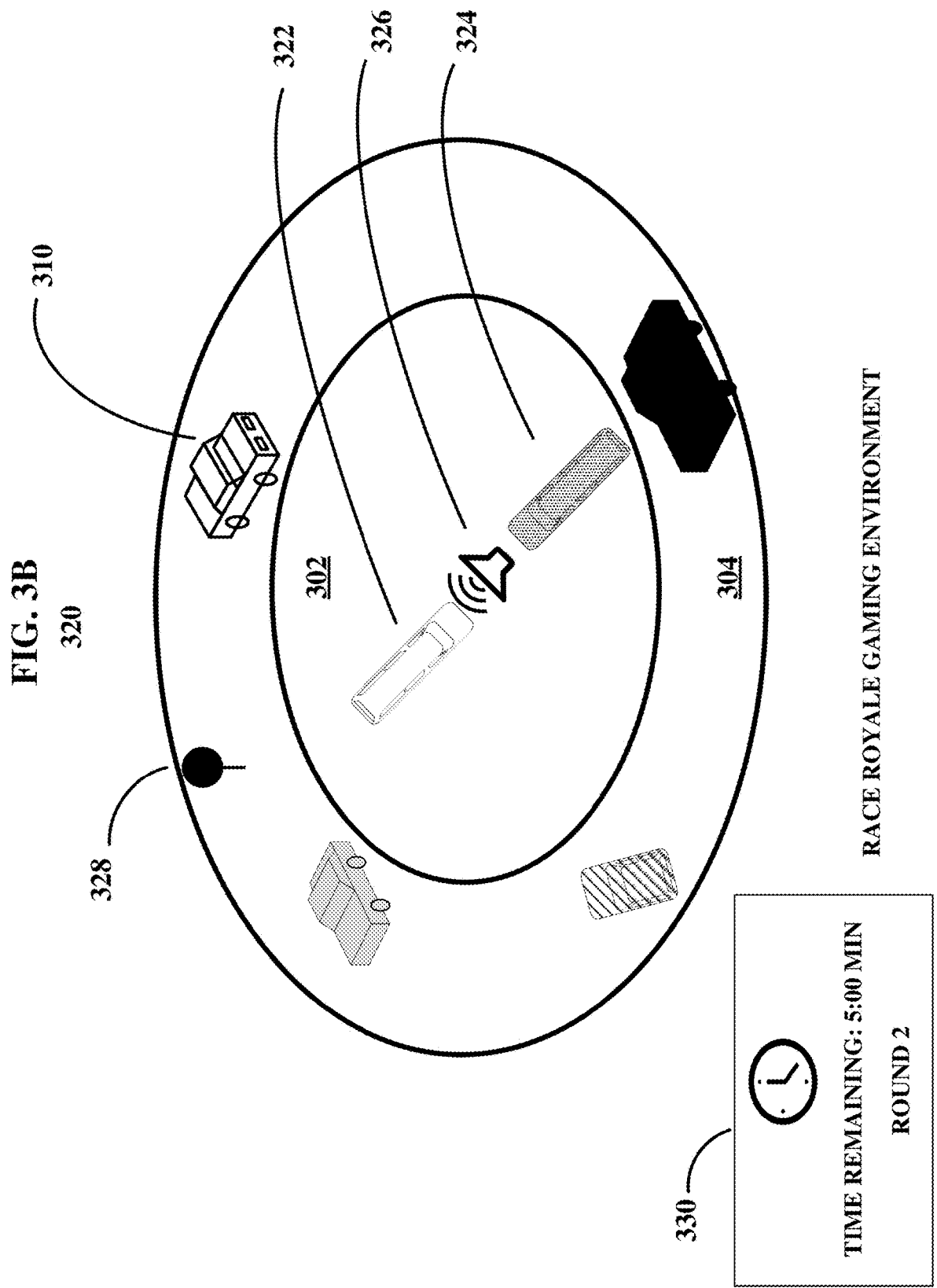

FIGS. 3A-3C respectively illustrate visual diagrams highlighting execution of rounds of race royale gameplay in an exemplary race royale gaming environment as described herein, with which aspects of the present disclosure may be practiced. FIGS. 3A-3C provide non-limiting front-end examples of processing described in the foregoing including system diagram 100 (FIG. 1) and method 200 (FIG. 2). FIGS. 3A-3C are intended to provide a progressive and cumulative non-limiting example of race royale gameplay in a race royale gaming environment.

FIG. 3A presents processing diagram 300, illustrating an abstracted representation of a first round of gameplay processing for exemplary race royale gameplay. Processing diagram 300 provides an abstracted view of a closed video game map formed in a concentric circle shape. As referenced in the foregoing description, the video game map may be a time-adjustable video game map, where a closed concentric circle map may comprise a plurality of zones/regions, respectively illustrated in processing diagram 300 by identifiers 302-306 that comprises a first zone 302, a second zone 304 and a third zone 306. Generation and rendering of an exemplary race royale gaming environment may position players (e.g., vehicles of players) at various starting locations within the video game map. For ease of understanding, the vehicles shown in processing diagram 300 each represent a respective player, where a plurality of players are competing in a gaming instance of the race royale gaming environment. For explanation purposes, a vehicle of first player 308 and a vehicle of a second player 310 are labeled in processing diagram 300.

As a video game map may be large with a plurality of players competing in a gaming instance of the race royale gaming environment, generation and rendering of a race royale gaming environment may start individual players at various locations throughout the video game map. For example, a starting location of a player may be randomly selected in one of the zones 302-306 of the video game map. A GUI indication may be presented through a GUI of a video game that alerts the players that race royale gameplay has initiated. Initiation of race royale gameplay enables user to travel traverse through the video game map, engage with features of the video game map, engage in elimination races with one or more other players or alternatively hide/avoid elimination races.

The example shown in processing diagram 300 is intended to illustrate an instance where a first player (shown as vehicle of first player 308) initiates an elimination race (e.g., head-to-head elimination race) with a second player (shown as vehicle of a second player 310). As referenced in the foregoing description, this may occur based on detection of a trigger 312, where an indication of a trigger is received through the race royale gameplay environment. In the example shown, a trigger 312 is received when the vehicle of first player 308 is focused on the vehicle of a second player 310 and a trigger 312 is initiated concurrently. In processing diagram 300, the trigger 312 is visually illustrated as a honking icon to illustrate that a programmed trigger is recognized when a focus of a player is on another vehicle and that player concurrently honks a horn of its vehicle. In the example shown, the vehicle of first player 308 is honking at the vehicle of a second player 310, which is recognized in the race royale gameplay as a trigger to initiate a head-to-head elimination race. Examples for creating and rendering an elimination race (e.g., a head-to-head elimination race) have been described in the foregoing description.

When an elimination race is initiated, a GUI representation of the race royale gaming environment may be updated to provide GUI indications for the elimination race, for example, that are specific to the players engaged in that specific elimination race. An elimination race identifier 314 is illustrated in processing diagram 300 to represent placement of GUI indicators for an elimination race within the video game map. At the very least, the elimination race identifier 314 provides an end point for players to race to within the video game map, which may be used to determine a winner of the elimination race. Once a winner of the elimination race is determined, the loser of the elimination race may be eliminated from the race royale gameplay. A winner may be provided a persistent vehicle upgrade option as referenced in the foregoing description. Furthermore, processing diagram 300 further comprises an icon indicating a random drop of a persistent vehicle upgrade 316. The race royale gaming environment may be configures so that persistent vehicle upgrades may be randomly dropped at locations within the video game map during a round of race royale gameplay. This encourages players to not remain stationary and seek out the persistent vehicle upgrades as well as engage in elimination races.

As referenced in the foregoing description, the video game map may be a time-adjustable video game map, that may be modified based on execution of one or more rounds of gameplay. A round of gameplay indicator 318 may be configured to track a current round of gameplay (e.g., round 1) and a time remaining in the round of gameplay. As an example, when the time elapses in the round of gameplay, the round of gameplay indicator 318 may be updated and the time-adjustable video game map adjusted (e.g., shrunk/reduced) to a subsequent representation, for example, shown in FIG. 3B. In some examples, the round of gameplay indicator 318 may be presented to players through a GUI representation of the race royale gaming environment. In other examples, the round of gameplay indicator 318 may not be presented to players, though tracked during race royale gameplay, so as to provide an element of surprise when a time-adjustable video game map is updated.

FIG. 3B presents processing diagram 320, illustrating an abstracted representation of a subsequent round (e.g., second round) of gameplay processing for exemplary race royale gameplay. Processing diagram 320 is a continued example from that shown in processing diagram 300.

As referenced in the foregoing description, the video game map may be a time-adjustable video game map, that may be modified based on execution of one or more rounds of gameplay. An update 330 may be provided to a round of gameplay indicator that tracks a current round of gameplay (e.g., round 2) and a time remaining in the round of gameplay. Processing diagram 320 provides an abstracted view illustrating that a time-adjustable video game map has been shrunk/reduced, eliminating a third zone 306 of the concentric circle map, for a second round of race royale gameplay. As such, remaining players are left to compete in a video game map that comprises the first zone 302 and the second zone 304.

As shown in processing diagram 320, the winner of the elimination race described in processing diagram 300 (FIG. 3A) was the second player, represented by the vehicle of a second player 310. The vehicle of the first player 308 has been eliminated from viewing to indicate that the first player has been eliminated from the race royale gameplay. Similar to what is described in processing diagram 300, a third player (shown as vehicle of third player 322) initiates an elimination race with a fourth player (shown as vehicle of a fourth player 324). As referenced in the foregoing description, this may occur based on detection of a trigger 326, similar to that previously described. In the example shown, the vehicle of third player 322 is honking (trigger 326) at the vehicle of a fourth player 324, which is recognized in the race royale gameplay as a trigger to initiate a head-to-head elimination race when the vehicle of the third player 322 is focused on the vehicle of the fourth player 324 in a GUI representation of the race royale gaming environment.

When an elimination race is initiated, a GUI representation of the race royale gaming environment may be updated to provide GUI indications for the elimination race, for example, that are specific to the players engaged in that specific elimination race. An elimination race identifier 328 is illustrated in processing diagram 320 to represent placement of GUI indicators for an elimination race within the video game map. At the very least, the elimination race identifier 328 provides an end point for players to race to within the video game map, which may be used to determine a winner of the elimination race. Once a winner of the elimination race is determined, the loser of the elimination race may be eliminated from the race royale gameplay similar to that previously described. A winner may be provided a persistent vehicle upgrade option as referenced in the foregoing description. Furthermore, similar to that described in round 1 of the race royale gameplay, random drops for a persistent vehicle upgrades may also occur through the second round of race royale gameplay.

FIG. 3C presents processing diagram 340, illustrating an abstracted representation of a final round of gameplay processing for exemplary race royale gameplay.

Processing diagram 340 is a continued example from that shown in processing diagram 320. As referenced in the foregoing description, the video game map may be a time-adjustable video game map, that may be modified based on execution of one or more rounds of racing gameplay. An update 344 may be provided to a round of gameplay indicator that tracks a current round of gameplay (e.g., final round) and a time remaining in the round of gameplay. Processing diagram 340 provides an abstracted view illustrating that a time-adjustable video game map has been shrunk/reduced, eliminating a second zone 304 of the concentric circle map, for players to engage in the final round of race royale gameplay. As such, remaining players are left to compete in a video game map that comprises only the first zone 302.

The race royale gaming environment may be configured to automatically update the GUI and the video game map to initiate a final elimination race that collectively comprises any remaining players that have not been eliminated from the race royale gameplay. Creation and initiation of the final elimination race may comprise setting GUI indicators 342 for a starting point and an ending point for the final elimination race. As such, the final elimination race is used to determine an outcome of the race royale gameplay, determining one or more winners based on a result of the players competing in the final elimination race. Processing diagram 340 illustrates that 4 player vehicles remain, where the remainder of the players have been eliminated in prior rounds of race royale gameplay. The gaming instance of the race royale gaming environment, presented through a GUI of a video game, may be automatically updated based on a completion of the final elimination race. Furthermore, as referenced in the foregoing description, data/content may be transmitted to a gaming platform interfacing with a video game to extend functionality associated with implementation of the race royale gaming environment.

Figure 4:
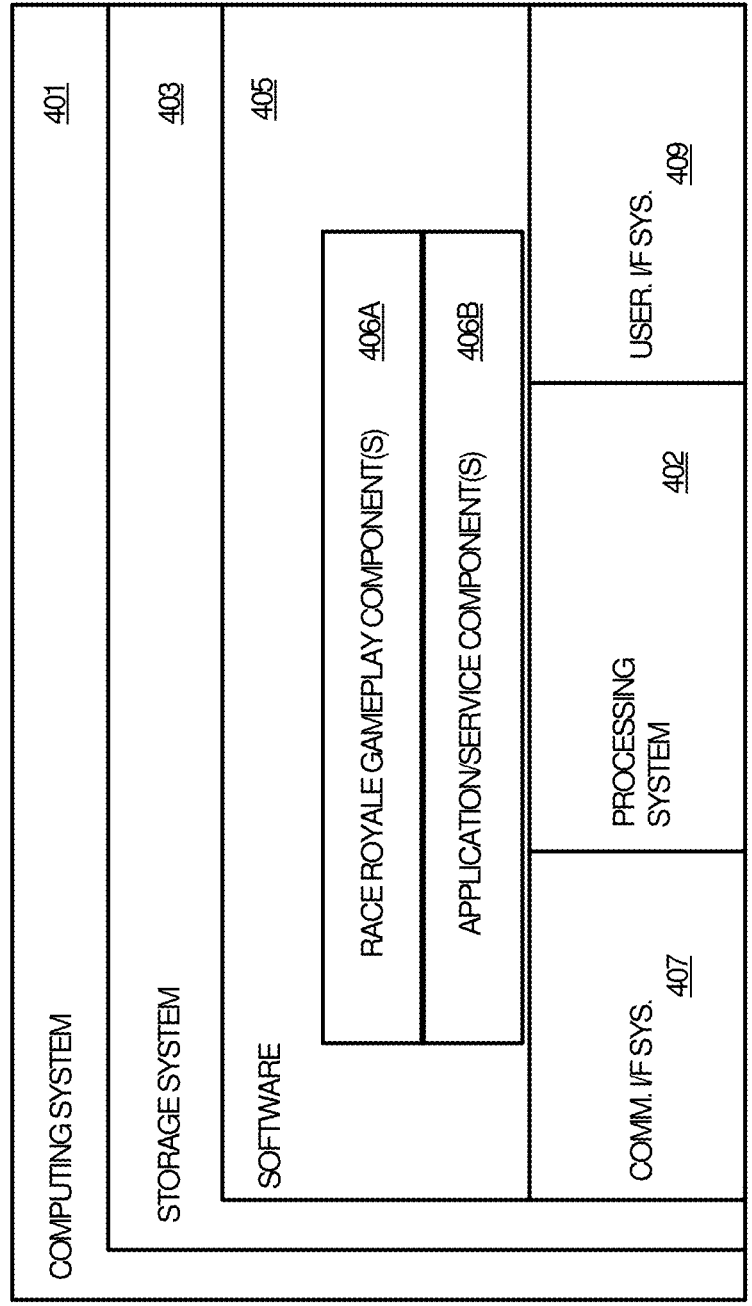
FIG. 4 illustrates a computing system suitable for implementing processing operations described herein related to provision of a race royale gaming environment as described herein, with which aspects of the present disclosure may be practiced.

FIG. 4 illustrates a computing system 401 suitable for implementing processing operations described herein related to provision of a race royale gaming environment as described herein, with which aspects of the present disclosure may be practiced. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be a gaming console utilized to access a video game, which may or may not be accessed via a network connection. For example, computing device 401 may be a device utilized to execute processing operations related to generation and/or execution of a race royale gaming environment (e.g., provided as a video game or video game mode). In another example, computing system 401 interfaces with a gaming console and/or gaming platform to enable output of content associated with a video game. For instance, computing device 401 may be configured as a server device that outputs data for a race royale gaming environment during a multiplayer gaming session and/or data for a gaming platform. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), processing operations described in method 200 (FIG. 2) or the accompanying description of FIGS. 3A-3C.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more race royale gameplay components 406a as described herein. Software 405 may further comprise application/service component(s) 406b that provide applications/services as described in the foregoing description such as a gaming application/service or a gaming platform.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of GUIs for video games (e.g., GUIs for a race royale gaming environment), GUIs for a gaming platform (e.g., including GUIs related to presentation of results of race royale gameplay, player rankings, XP, rewards, chat/messaging, etc.), GUIs for other interfacing applications/services or any combination thereof. User interface system 409 comprises a graphical user interface that presents graphical user interface elements representative of any point in the processing described in the foregoing description including processing operations described in system diagram 100 (FIG. 1), method 200 (FIG. 2) and front-end representations related to the description of FIGS. 3A-3C. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services (e.g., gaming applications/services) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
generating a race royale gaming environment configured to:
provide a time-adjustable video game map configured to enable racing between a plurality of players of the race royale gaming environment in a gaming instance of racing gameplay until an overall winner is determined, wherein the time-adjustable video game map comprises a total space available to the plurality of players during the gaming instance of racing gameplay, and wherein the time-adjustable video game map shrinks to a smaller size at least once during the gaming instance of racing gameplay,
enable any of the plurality of players to challenge one or more other of the plurality of players to one-on-one elimination races, wherein a loser of each one-on-one elimination race is eliminated from the gaming instance of racing gameplay, and
provide persistent vehicle upgrades, accessible to the plurality of players, that persist during the gaming instance of racing gameplay; and
rendering the gaming instance of racing gameplay of the race royale gaming environment in an instance of a racing video game.

2. The method of claim 1, wherein the generating of the race royale gaming environment is further configured to provide one or more persistent vehicle upgrade options to a winner of any of the one-on-one elimination races during the gaming instance of racing gameplay.

3. The method of claim 2, wherein the one or more persistent vehicle upgrade options comprise a first option to add an enhancement to an existing vehicle of the winner of the one-on-one elimination race and a second option to acquire a new vehicle to use during the gaming instance of racing gameplay.

4. The method of claim 1, wherein the generating of the race royale gaming environment is further configured to enable the persistent vehicle upgrades to be presented at random locations in the time-adjustable video game map during commencement of the gaming instance of racing gameplay.

5. The method of claim 1, wherein the time-adjustable video game map is a concentric circle map that shrinks to a smaller size after a predetermined amount of time elapses during the gaming instance of racing gameplay.

6. The method of claim 5, wherein the generating of the race royale gaming environment is further configured to set one or more timed rounds for the gaming instance of racing gameplay that each coincide with a shrinking of the concentric circle map as the gaming instance of racing gameplay elapses.

7. The method of claim 6, wherein the generating of the race royale gaming environment is further configured to generate a final race that collectively comprises remaining players of the plurality of players after completion of the one or more timed rounds, and wherein a winner of the final race is the overall winner of the gaming instance of racing gameplay of the race royale gaming environment.

8. The method of claim 1, further comprising: updating a record on a gaming platform based on an outcome of an execution of the race royale gaming environment.

9. A system comprising:
at least one processor; and
a memory, operatively connected with the at least one processor, storing computer-executable instructions that, when executed by the at least one processor, causes the at least one processor to execute a method that comprises:
generating a race royale gaming environment configured to:
provide a time-adjustable video game map configured to enable racing between a plurality of players of the race royale gaming environment in a gaming instance of racing gameplay until an overall winner is determined, wherein the time-adjustable video game map comprises a total space available to the plurality of players during the gaming instance of racing gameplay, and wherein the time-adjustable video game map shrinks to a smaller size at least once during the gaming instance of racing gameplay,
enable any of the plurality of players to challenge one or more other of the plurality of players to one-on-one elimination races, wherein a loser of each one-on-one elimination race is eliminated from the gaming instance of racing gameplay, and
provide persistent vehicle upgrades, accessible to the plurality of players, that persist during the gaming instance of racing gameplay; and
rendering the gaming instance of racing gameplay of the race royale gaming environment in an instance of a racing video game.

10. The system of claim 9, wherein the generating of the race royale gaming environment is further configured to provide one or more persistent vehicle upgrade options to a winner of any of the one-on-one elimination races during the gaming instance of racing gameplay.

11. The system of claim 10, wherein the one or more persistent vehicle upgrade options comprise a first option to add an enhancement to an existing vehicle of a winner of the one-on-one elimination race and a second option to acquire a new vehicle to use during the gaming instance of racing gameplay.

12. The system of claim 9, wherein the generating of the race royale gaming environment is further configured to enable the persistent vehicle upgrades to be presented at random locations in the time-adjustable video game map during commencement of the gaming instance of racing gameplay.

13. The system of claim 9, wherein the time-adjustable video game map is a concentric circle map that shrinks to a smaller size after a predetermined amount of time elapses during the gaming instance of racing gameplay.

14. The system of claim 13, wherein the generating of the race royale gaming environment is further configured to set one or more timed rounds for the gaming instance of racing gameplay that each coincide with a shrinking of the concentric circle map as the gaming instance of racing gameplay elapses.

15. The system of claim 14, wherein the generating of the race royale gaming environment is further configured to generate a final race that collectively comprises remaining players of the plurality of players after completion of the one or more timed rounds, and wherein a winner of the final race is the overall winner of the gaming instance of racing gameplay of the race royale gaming environment.

16. The system of claim 9, wherein the method, executed by the at least one processor further comprises: updating a record on a gaming platform based on an outcome of an execution of the race royale gaming environment.

17. A non-transitory computer-readable storage media storing computer-executable instructions, that when executed by at least one processor, causes the at least one processor to execute a method comprising:
generating a race royale gaming environment configured to:
provide a time-adjustable video game map configured to enable racing between a plurality of players of the race royale gaming environment in a gaming instance of racing gameplay until an overall winner is determined, wherein the time-adjustable video game map comprises a total space available to the plurality of players during the gaming instance of racing gameplay, and wherein the time-adjustable video game map shrinks to a smaller size at least once during the gaming instance of racing gameplay,
enable any of the plurality of players to challenge one or more other of the plurality of players to one-on-one elimination races, wherein a loser of each one-on-one elimination race is eliminated from the gaming instance of racing gameplay, and
provide persistent vehicle upgrades, accessible to the plurality of players, that persist during the gaming instance of racing gameplay; and
rendering the gaming instance of racing gameplay of the race royale gaming environment in an instance of a racing video game.

18. The non-transitory computer-readable storage media of claim 17, wherein the race royale gaming environment is further configured to:
provide one or more persistent vehicle upgrade options to a winner of any of the one-on-one elimination races during the gaming instance of racing gameplay, and
enable the persistent vehicle upgrades to be presented at random locations in the time-adjustable video game map during commencement of the gaming instance of racing gameplay.

19. The non-transitory computer-readable storage media of claim 17, wherein the time-adjustable video game map is a concentric circle map that shrinks to a smaller size after a predetermined amount of time elapses during the gaming instance of racing gameplay, and wherein the generating of the race royale gaming environment is further configured to set one or more timed rounds for the gaming instance of racing gameplay that each coincide with a shrinking of the concentric circle map as the gaming instance of racing gameplay elapses.

20. The non-transitory computer-readable storage media of claim 19, wherein the race royale gaming environment is further configured to set a final race that collectively comprises remaining players of the plurality of players after completion of the one or more timed rounds, and wherein a winner of the final race is the overall winner of the gaming instance of racing gameplay of the race royale gaming environment.

\* \* \* \* \*